United States Patent
Eberlein et al.

(10) Patent No.: US 10,686,882 B2
(45) Date of Patent: Jun. 16, 2020

(54) CHANGE MANAGEMENT USING A THING-MODEL ON AN INTERNET-OF-THINGS PLATFORM

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 15/983,812

(22) Filed: May 18, 2018

(65) Prior Publication Data
US 2019/0356737 A1   Nov. 21, 2019

(51) Int. Cl.
*H04L 29/08* (2006.01)
*H04L 12/24* (2006.01)
*H04L 12/26* (2006.01)

(52) U.S. Cl.
CPC .......... *H04L 67/12* (2013.01); *H04L 41/0816* (2013.01); *H04L 67/10* (2013.01); *H04L 41/14* (2013.01); *H04L 43/08* (2013.01)

(58) Field of Classification Search
CPC ..... H04L 67/02; H04L 67/2823; H04L 67/16; H04L 41/0856; H04L 67/12; H04L 67/10; H04L 41/0816; H04L 41/14; H04L 43/08; H04W 4/18
See application file for complete search history.

(56) References Cited

U.S. PATENT DOCUMENTS

| 7,523,142 | B2 | 4/2009 | Driesen et al. |
|---|---|---|---|
| 7,657,575 | B2 | 2/2010 | Eberlein et al. |
| 7,720,992 | B2 | 5/2010 | Brendle et al. |
| 7,734,648 | B2 | 6/2010 | Eberlein |
| 7,739,387 | B2 | 6/2010 | Eberlein et al. |
| 7,894,602 | B2 | 2/2011 | Mueller et al. |
| 7,962,920 | B2 | 6/2011 | Gabriel et al. |
| 7,971,209 | B2 | 6/2011 | Eberlein et al. |
| 8,126,919 | B2 | 2/2012 | Eberlein |
| 8,200,634 | B2 | 6/2012 | Driesen et al. |
| 8,225,303 | B2 | 7/2012 | Wagner et al. |
| 8,250,135 | B2 | 8/2012 | Driesen et al. |
| 8,291,038 | B2 | 10/2012 | Driesen |
| 8,301,610 | B2 | 10/2012 | Driesen et al. |
| 8,302,160 | B2 | 10/2012 | Hofmann et al. |
| 8,316,422 | B2 | 11/2012 | Hofmann et al. |
| 8,321,678 | B2 | 11/2012 | Hofmann et al. |

(Continued)

OTHER PUBLICATIONS

U.S. Appl. No. 14/960,983, filed Dec. 7, 2015, Eberlein, et al.
(Continued)

*Primary Examiner* — Jungwon Chang

(74) *Attorney, Agent, or Firm* — Fish & Richardson P.C.

(57) ABSTRACT

An IoT data packet of IoT data in a first data format is received over a distributed system from an Internet of Things (IoT) device. A determination is made that a second different data format of at least some of the IoT data is being used by at least one application by using an IoT data model of an IoT persistency service storing the IoT data in different data formats supporting different applications. A transformation rule in the IoT data model is used to transform the IoT data packet in the first data format to the second different data format. The IoT data packet in the second different data format is stored in the IoT persistency service.

20 Claims, 7 Drawing Sheets

(56) References Cited

U.S. PATENT DOCUMENTS

| | | |
|---|---|---|
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 2008/0120129 A1 | 5/2008 | Seubert et al. |
| 2010/0153341 A1 | 6/2010 | Driesen et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0244834 A1* | 8/2014 | Guedalia ............... H04L 67/16 709/224 |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2017/0006135 A1* | 1/2017 | Siebel .................... H04L 67/02 |
| 2017/0025441 A1 | 1/2017 | Mori |
| 2017/0149937 A1* | 5/2017 | Ren ........................ H04W 4/18 |
| 2019/0007513 A1* | 1/2019 | Flynn, IV ........... H04L 67/2823 |
| 2019/0028349 A1* | 1/2019 | Chen .................. H04L 41/0856 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein, Peter.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.

* cited by examiner

CHANGE MANAGEMENT USING A THING-MODEL ON AN INTERNET-OF-THINGS PLATFORM

BACKGROUND

Data entered into and output by Internet-of-Things (IoT) applications can change structure with each new version of the input device, yet the structure of the data typically does not change with the version of the application running and storing the data. Deployed IoT devices may provide data for a long time, such as for years. The data format may remain unchanged during the lifecycle of the device, unless, for example, a firmware upgrade changes the format and content of the data. New devices that are deployed can have new formats of data as well as new data sets. As a result, applications working with IoT data may need to deal with different data formats.

SUMMARY

The present disclosure describes techniques for performing change management for an Internet-of-Things (IoT) platform. An IoT data packet of IoT data in a first data format is received over a distributed system from an IoT device. A determination is made that a second different data format of at least some of the IoT data is being used by at least one application by using an IoT data model of an IoT persistency service storing the IoT data in different data formats supporting different applications. A transformation rule in the IoT data model is used to transform the IoT data packet in the first data format to the second different data format. The IoT data packet in the second different data format is stored in the IoT persistency service.

In a particular implementation, a computer-implemented method comprises: receiving, from an IoT device over a distributed system, an IoT data packet of IoT data in a first data format; determining, using an IoT data model of an IoT persistency service storing the IoT data in different data formats supporting different applications, that a second different data format of at least some of the IoT data is being used by at least one application; transforming, using a transformation rule in the IoT data model, the IoT data packet in the first data format to the second different data format; and storing, in the IoT persistency service, the IoT data packet in the second different data format.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, applications can have access to any version of data that is provided by IoT devices. Second, data missing from a version of data from an IoT device can be derived from information supplied by an external source. Third, a central infrastructure approach can provide data transformations independent of application versions.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
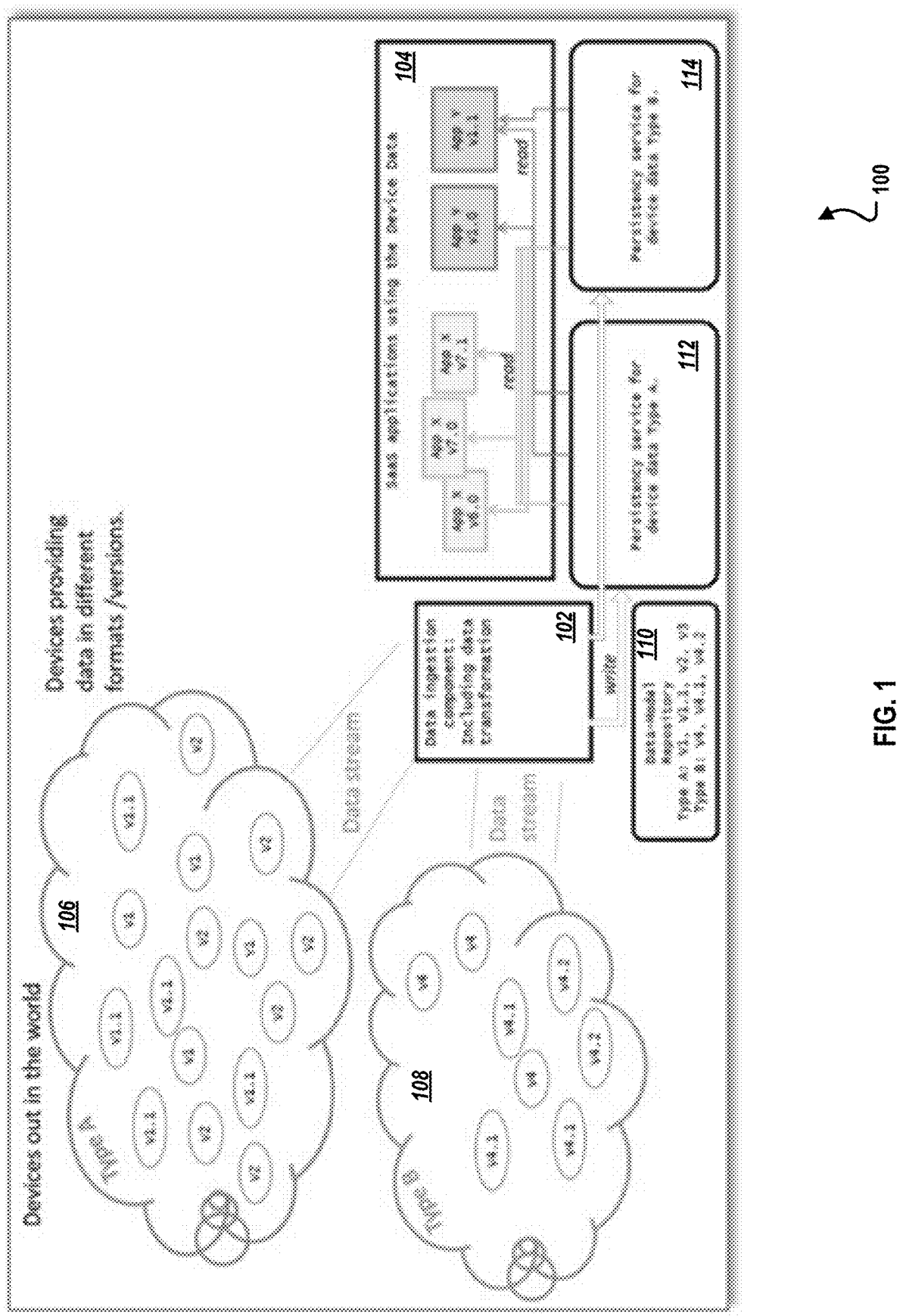
FIG. 1 is a block diagram of an example of a landscape of Internet of Things (IoT) devices providing data in different formats and versions, according to an implementation of the present disclosure.

The following detailed description describes techniques for performing change management for an Internet-of-Things (IoT) platform, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

An application working with IoT device data can define or use a model (or a thing-model) for the data input that provides, for example, a digital representative of reality. A new version of an application can have a new definition of a thing-model.

The application will typically also define persistency to store the data provided by the devices in a format to allow storing content matching the thing-model. A persistency can be a database table storing a relational representation of the model to ease fast access to single records. The persistency can also allow aggregations on columns and provide views to join data of different tables. Data can also be stored in non-relational format, such as in an Extensible Markup Language (XML) or a JAVASCRIPT Object Notation (JSON) file, with transformations between different formats.

Conventional approaches for application lifecycle management, such as migrating to a new version of software or data, can include defining a downtime for the application upon deployment, transforming the persistency to the new format, and subsequently working with the new persistency and the new thing-model. However, using techniques described in the present disclosure, data can be sent in any format previously or currently known to the system. This prevents the need to continuously update data formats to meet a single format known by the system. For example, several different data formats can exist that are written and stored using multiple application versions reading and operating on the data. Any one piece of data may be read by more than one application (of potentially different versions), making it infeasible to convert data for one specific application. To allow several data providers and several data consumers to use the same set of data, data transformations can be provided and executed. The data transformations can be part of a central infrastructure approach for the problem of configuration management for IoT data. Data transformations can make it possible to store and provide data that is independent of the application version.

Techniques for configuration management of IoT data can use a persistency, which stores the data relationally. In some implementations, the data can be stored in a format where each record defines the data structure (for example, using XML). Data transformation modules (DTMs) can be defined that transform data from an old format to a new format, such as if data types have changed. Moreover, data acquisition modules (DAMs) can be defined that enrich data sets for records. Enrichment can occur using information from external data sources, for example, to enrich incomplete data sets.

FIG. 1 is a block diagram of an example of a landscape of IoT devices 100 providing data in different formats and versions, according to an implementation of the present disclosure. The landscape of IoT devices 100 includes a data ingestion component 102 that includes transformation modules, applications 104 that use the data from Type A IoT devices 106 and Type B IoT devices 108, a thing-model store 110, Type A persistency services 112, and Type B persistency services 114.

Data device data, including data from the Type A IoT devices 106 and the Type B IoT devices 108, can be processed by the data ingestion component 102, which can then provide the data to the respective persistency service 112 or 114. Several other versions of devices can exist in the world in addition to the Type A IoT devices 106 and the Type B IoT devices 108, and each can potentially send data in several different versions. The respective persistency services 112 or 114 can process and store several versions.

The applications 104 can include applications and services that can be deployed in several versions as well, consuming device data using the respective persistency services 112 or 114. Different apps and services can be built based on different data models.

Data transformations can be used by the data ingestion component 102, persistency services 112 and 114, and applications 104. For example, a given data transformation can be provided with the data model and stored in the model repository. Ingestion of data from IoT devices can use the data transformation modules (DTMs) to transform incoming data to other versions, including earlier and later versions. Ingestion services can be configured to store the incoming data in more than one version, including transforming data to newer formats and to earlier formats (to support applications that still read old format). Applications can use the same DTMs used for transforming data stored in the service. For example, assume that Application X is using model version 3 and Application Y is using model version 2. Then, Application X can use two DTMs, as needed, to transform version 1 data (or version 2 data) to version 3: DTM 1→2 and DTM 2→3. Application Y can use DTMs to transform to version 2: DTM 1→2 and DTM 3→2, depending on whether to to-be-transformed data is version 1 or version 3. This can be used to transform data that has not yet been transformed to the required version and stored.

In some implementations, if data transformation is not possible, data acquisition modules (DAMs) can provide another mechanism to fill additional new fields. For example, a given DAM can be called by a DTM transforming data to a target version. The DAM can be configured with data sets provided by the devices. The DAM can access external data storage or other external resources as needed. The DAM can then access external data source to compute target values for fields that are not provided by the IoT device. DAMs can be integrated into the ingestion services, as needed, and into applications reading the data (and the batch process transforming old data records to new versions).

Figure 2:
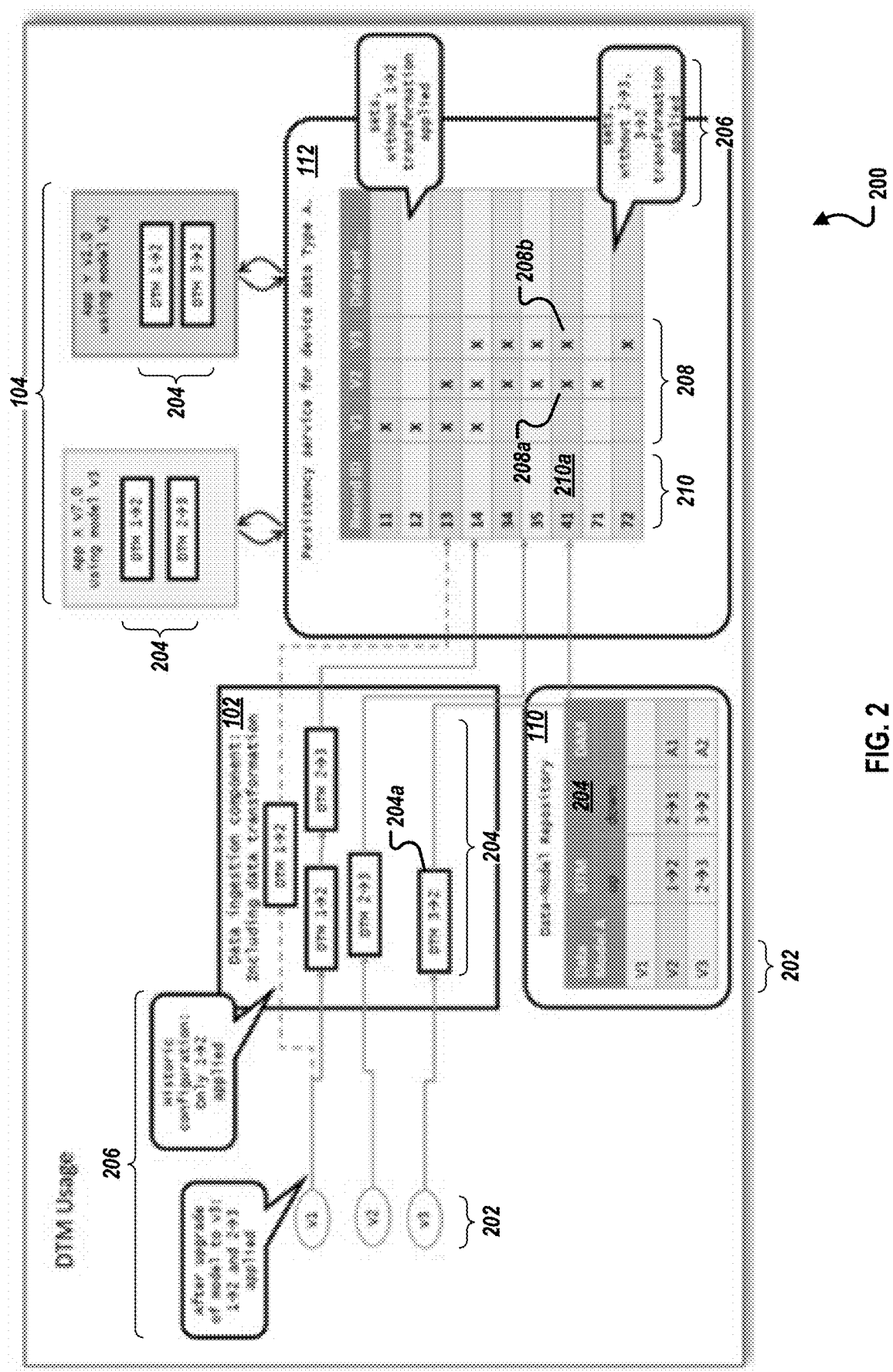
FIG. 2 is a block diagram of example ingestions of data from IoT devices, according to an implementation of the present disclosure.

FIG. 2 is a block diagram of example ingestions 200 of data from IoT devices, according to an implementation of the present disclosure. The data ingestion component 102 can receive data from IoT devices 106 and 108. Each of the devices is at one of versions 202 (for example, V1, V2, and V3). The data ingestion component 102 can use DTMs 204 to process the received data, changing the data from one versions format to another.

As shown in example scenarios 206, the DTMs 204 can be used to create version-specific values 208 for specific record IDs 210. For example, when IoT data is received and has a version 202 of V3, a DTM 204a can be used to create a specific V2 value 208a for a specific record ID 210a. The V3 data be stored as is in a specific V3 value 208b.

For example, with a new version of the data model, such as an upgrade from V1 to V2, new device data formats (DDF) can be supported, such as DDF2 instead of DDF1. Using the new version can mean that devices send more or different parameters and other data units. The storage of data matching the new data format can be enabled in the persistency without affecting (for example, disabling) storage of the data in the old format. For example, existing DDF1 columns are not altered or deleted. Altered data types, using DDF2, are stored in a new column with a transformation rule from the old to the new data type, or essentially DDF1→DDF2.

Figure 3:
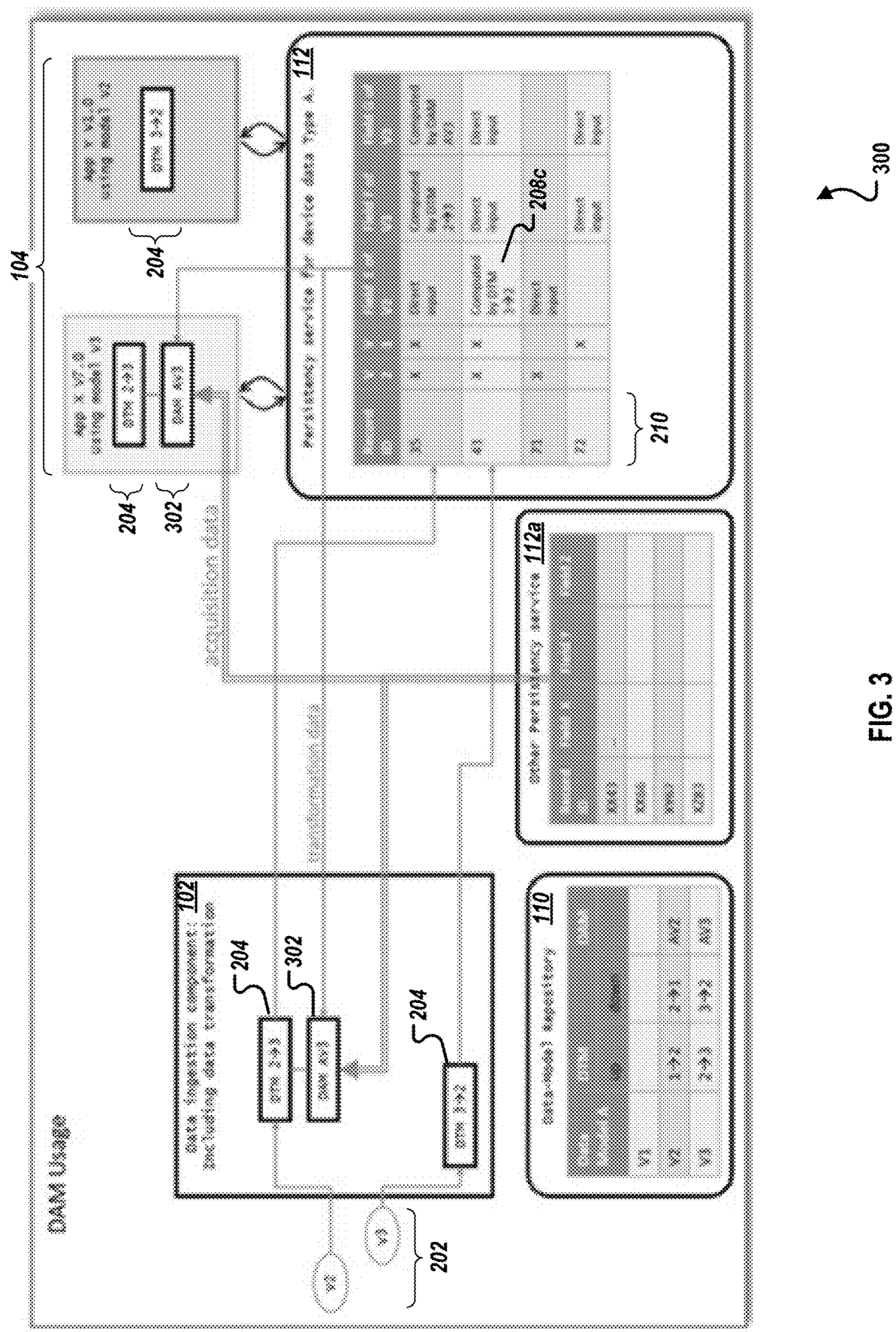
FIG. 3 is a block diagram of example ingestions of data from IoT devices, according to an implementation of the present disclosure.

FIG. 3 is a block diagram of example ingestions 300 of data from IoT devices, according to an implementation of the present disclosure. The data ingestion component 102 can receive data from IoT devices 106 and 108. Each of the devices is at one of versions 202 (for example, V1, V2, and V3). The data ingestion component 102 can use a DAM 302 to process the received data, using another persistency service 112a to acquire data that is used to compute a computed value 112c.

Together with the data model, new data transformation modules can be provided that include, for example, DTM (DDF1→DDF2), DTM (DDF2→DDF1), and DAM (DDF1→DDF2) (for example, the DAM 302). Each DTM can transform the data between different versions. When a subsequent upgrade is to occur, the format may be changed again (for example, to DDF3). At that time, the persistency can be changed again, and new DTMs that include DTM (DDF2→DDF3), DTM (DDF3→DDF2), and DAM (DDF2→DDF3) can be defined.

Upon an upgrade of an application a new version (for example, V7.2→V7.3), which reads or operates on the data, the new data model can be supported, taking advantage of the new device data formats (for example, DDF2 instead DDF1). If the application can work with a data model version 2, then the data stored in version 1 can be transformed on-the-fly (in real time) to version 2. In a similar way, if there is data stored in a version 3 format, then the data can be transformed on-the-fly to version 2. Upon an upgrade of the application to support model version 3, the data version 1 can be transformed to 2, which can then be transformed to 3, which can be read natively by the application.

For incoming data that is newly received, the data format for the received can be determined. Once the data format is known, pertinent DTMs and DAMs can be called as needed to update the required columns as the data is stored. As long as at least one application still exists that reads a previous version of the data, received data will continue to be transformed to this format.

Historical data does not need to be transformed, as any transformation that is needed can occur in real time using a DTM. In some implementations, to improve read performance, transformed data can be stored in the transformed version as well. In some implementations, batch (or offline) jobs can be run to compute and store data in a desired old or new format in addition to the format written initially.

If new data is sent that does not yet fit to an existing persistency, the persistency update can be triggered to allow storing the new data. The application can still use a version in the previous version format. To enable the old application to read the new data, a backwards data transformation can also be provided.

In some implementations, a system that is configured to perform change management for an IoT platform can include the following components. A thing model change infrastructure (TMCI) can be figured to do the following. Different versions of the thing model are stored. The thing model is mapped to a database table. A database table is managed that stores multiple versions of the thing model. The persistency is adjusted to a new model, including supporting a new version without destroying old versions and storing the new version of the persistency in parallel with previous versions. Information that identifies which model version is consumed, by which applications, is stored. A DTM is used to compute content for a new version of the model using content of old versions of the model. A DTM is used to compute content of a previous version of the model using content of a new version of the model. A DAM is used to compute content for a new version of the model using content of the old version and external data. Data ingestion operations are used to retrieve DTMs and DAMs for content computation of device instream. Applications and services are provided that read data to retrieve DTMs and DAMs to map data to the data version that they use.

A persistency manager can perform persistency management for several versions, including providing the following services. A table structure is computed for a model version. Then, a table is created with the computed table structure if the table does not already exist. When a change is detected in a model version: a new table structure is computed for a new model version, the new table structure is compared with the old table structure, a new field is added for every field that is new, obsolete fields are retained, and for every field that has a changed type, a new field is created with a new name (for example, <field-name>#<nr>: TEMPERATURE, TEMPERATURE #1, . . . ) and a new type.

For data writes, data elements are written to the fields which had been defined for the version (the originally named field or the field with a numbered name). For data reads: the version that is to be read is specified, data is read from the table in the version it has been stored, and data is transformed using applicable DTMs and DAMs to the desired target version.

Figure 4:
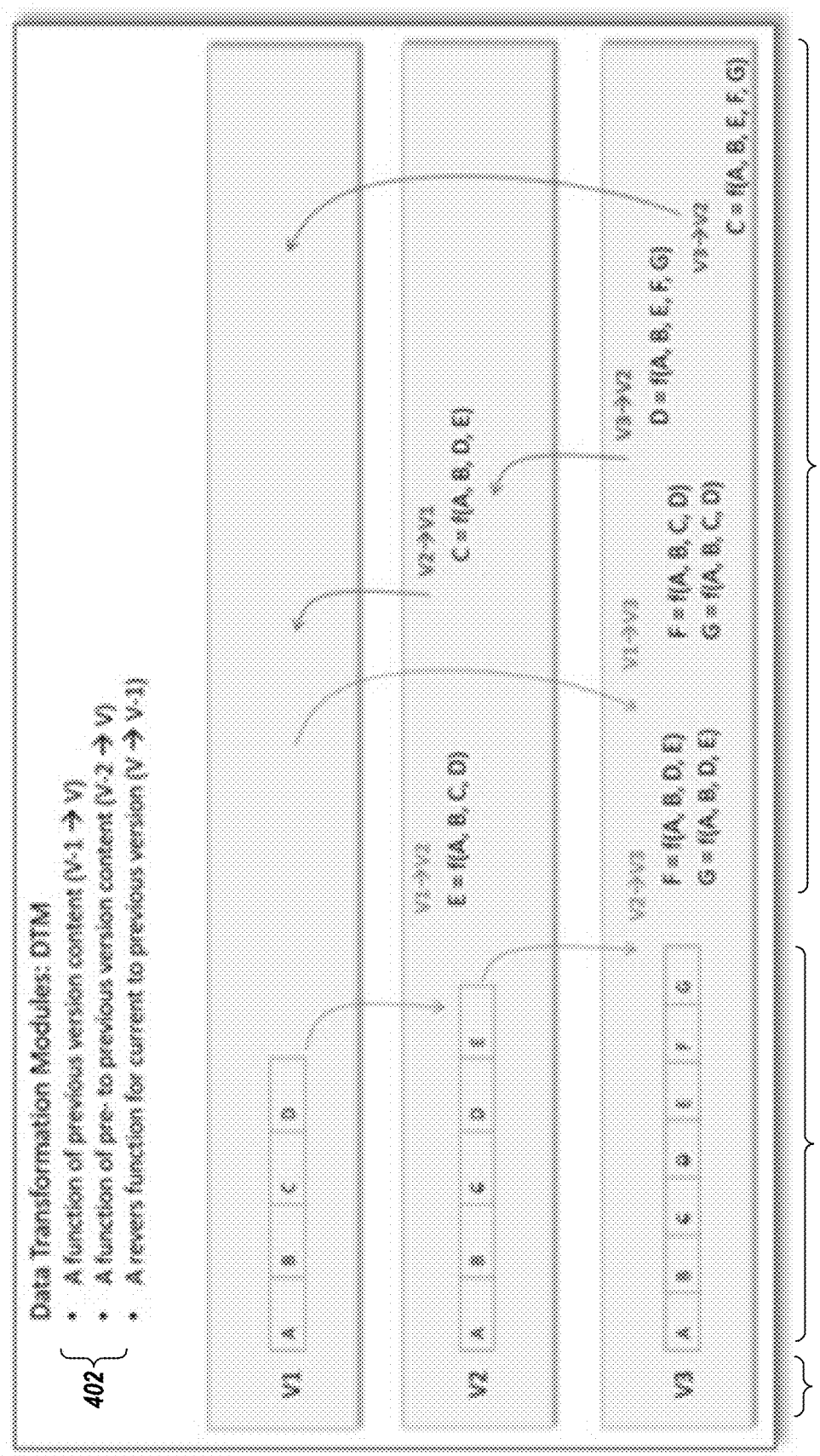
FIG. 4 is a block diagram of an example transformations, according to an implementation of the present disclosure.

FIG. 4 is a block diagram of an example transformations 400, according to an implementation of the present disclosure. For example, one of the DTMs 204 can perform functions 402 that convert received IoT data from one of the versions 202 to another version. As versions increase from V1 to V2 to V3, for example, additional fields 404 can be added.

In an example transformation, a model change can be defined to indicate that, for a temperature field, the data sent is to be changed from ° F. to ° C. The database table can store ° F. in field F1. The database table can then be extended by a field F2 for storing a value in ° C. A DTM can be created that computes F2 values from F1 values. Another DTM can be created that computes F1 values from F2 values.

In another example, a data type change can be defined in DTMs, for example, with the following transformations: VARCHAR→int, int→float, float→decimal, and so on. Data types are not changed for stored data, as this would invalidate the applications that read the old format. Instead, all data sets can be stored, and transformations can be used to convert one type to another.

In another example, additional domain values can be added. For example, if a data field is constrained by a domain value set and the set is extended, another data field is stored as well. The new data field can then have the extended list of domain values, and the old data fields can retain the old domain values. A mapping can be provided from old values to new values, allowing a two-way transformation. As an example, an existing list of values associated with weather can include Sunny, Cloudy, and Raining. A new list of values associated with weather can include Sunny, Cloudy, Foggy, Raining, and Thunderstorm. Thunderstorm can be mapped to Raining in the old model, and Foggy can be mapped to Cloudy.

Other examples of transformations include: 1) measurement unit transformations (for example, kilometers to miles, and centimeters to inches); 2) state transitions, including value range changes, for example, Running/Stopped→Starting/Running/Suspended/Stopped, and Starting and Suspended to Stopped; 3) value relationships, for example, engine temperature→surface temperature, oil temperature, wheel temperature, and engine temperature=oil temperature, in which other values can be set to an initial value or set using a DAM; 4) different measurements of the same unit in which new devices provide an "offset" compared to an old value, for example, as a sensor is moved to another location or has a different manufacturer; and 5) the sensors can be measured at the same object and the output correlated using a correlation function provided by a DTM.

An example sequence of steps follows. An application runs with one version of a thing-model V1 and reads this version from a persistency service. The external IoT devices send data in this model format. The data ingestion component 102 stores this version in the persistency service. A new device version is used in addition, sending data in a new format V2. The application is still the same. A new thing-model version V2 is shipped, with transformation rules V2→V1 and V1→V2. The deployment adjusts the persistency service to support the new format, so the device data V2 can be stored. When new data is sent, the data is stored in the new format V2. When old data is sent, the data is stored in the old format V1. The application processes V1 data. The application can read data stored in format V2 using the transformation V2→V1. A DTM 204 of the data ingestion component 102 can transform data sent by devices in format V1 to V2 and store both formats.

Subsequently, the application can be upgraded to support and take advantage of V2, and an example sequence of steps follows. The new version of the application reads data in format V2, and if the data set is V1, the data is transformed: V1→V2. When new data is sent, the data is stored in the new format V2. When old data is sent, the data is stored in the old format V1. The data ingestion component 102 can transform data sent by devices in format V1 to V2 and store both formats. The existing records only stored in V1 are processed and stored in V2 additionally.

Subsequently, the application can be upgraded to support and take advantage of format V3. This is accompanied by thing-model V3 and transformation rules V2→V3 and V3→V2. For performance reasons, transformation rules V1→V3 and V3→V1 can be added. The deployment adjusts the persistency service, so V3 can be stored. When new data is sent, the data is stored in the new format V2. When old data is sent, the data is stored in the old format V1. The new version of the application reads data in format V3, if the data set is V1, the data is transformed V1→V3, if the data set is V2, the data is transformed V2→V3. The data ingestion component 102 can transform data sent by devices in format V1 to V2 and V3 and store both formats. The existing records only stored in V1 and V2 are processed and stored in V2 and V3 additionally.

When a new device version is used in addition, data can be sent in a new format V3. The persistency is already capable of storing V3. When new data V3 is sent, the data is stored in the new format V3. When data V2 is sent, the data is stored in the format V2. When old data is sent, the data is stored in the old format V1. The application reads V3, or transforms V1 and V2 to V3.

Figure 5:
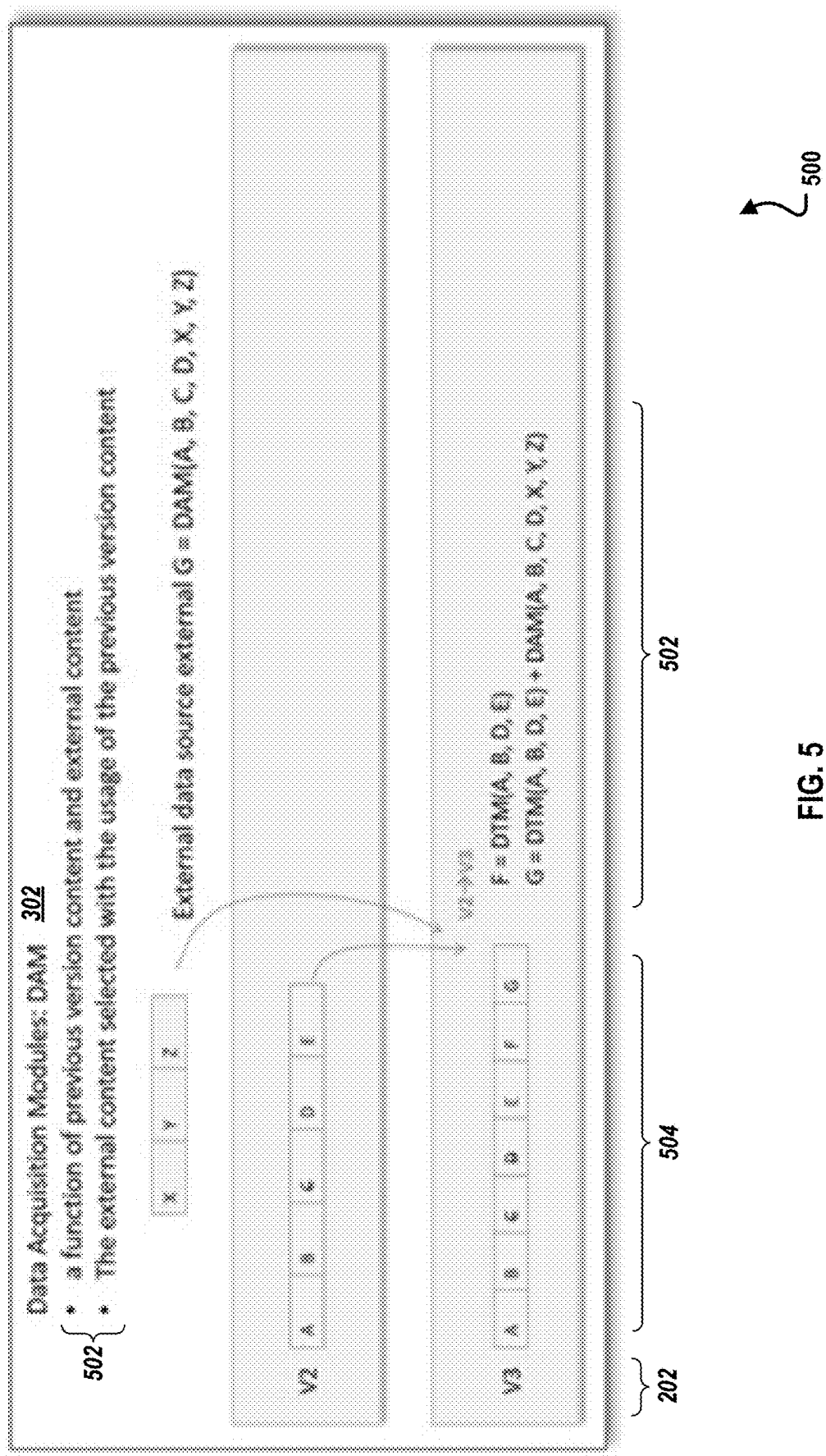
FIG. 5 is a block diagram of an example transformations, according to an implementation of the present disclosure.

FIG. 5 is a block diagram of an example transformations 500, according to an implementation of the present disclosure. For example, one of the DAMs 302 can perform functions 502 that acquire data from external data sources to generate one of the versions 202 to another version. As versions increase from V2 to V3, for example, additional fields 504 can be added.

An example sequence of steps follows. Initially, in Version 2 of an application, Version 2 devices do not send geographical data, and the thing model does not contain geographical coordinates. The master data of the user using the IoT device has an address stored, with name, street, street number, city, and postal code. Version 3 the model is extended, and a geographical coordinate is added to the new data model.

Subsequently, new versions of the device can send geographical data. The geographical coordinate cannot be computed out of old thing model data. However, a geographical coordinate can be computed out of the provided master data. For example, the user's street, street number, and city can be read, and the geographical coordinate can be computed from the information. Additionally, the new application can suggest that users define the geographical coordinate of their device, and the data can be retrieved from user input.

If the old data set contains geographical and time information, other data can be integrated. For example, weather data (including a current barometric pressure and outside temperature) can be obtained from a weather data service. Based on known location and time information, data associated with the vicinity can be added.

In another example, an application can run with one version of a thing-model V2, using the following. The external devices sends data in this model format. The data ingestion component 102 stores this version in the persistency. The application stores some additional metadata or has access to other data. A new version of the application is deployed, supporting thing-model V3. The persistency service is adjusted to support V3 in addition to other versions. Old device data is stored in format V2. New device data is stored in format V3. The application reads data in format V3. If the data set is V2, the application can call a DAM to retrieve data for the new fields of V3 that are not part of V2 and cannot be computed out of V2.

Figure 6:
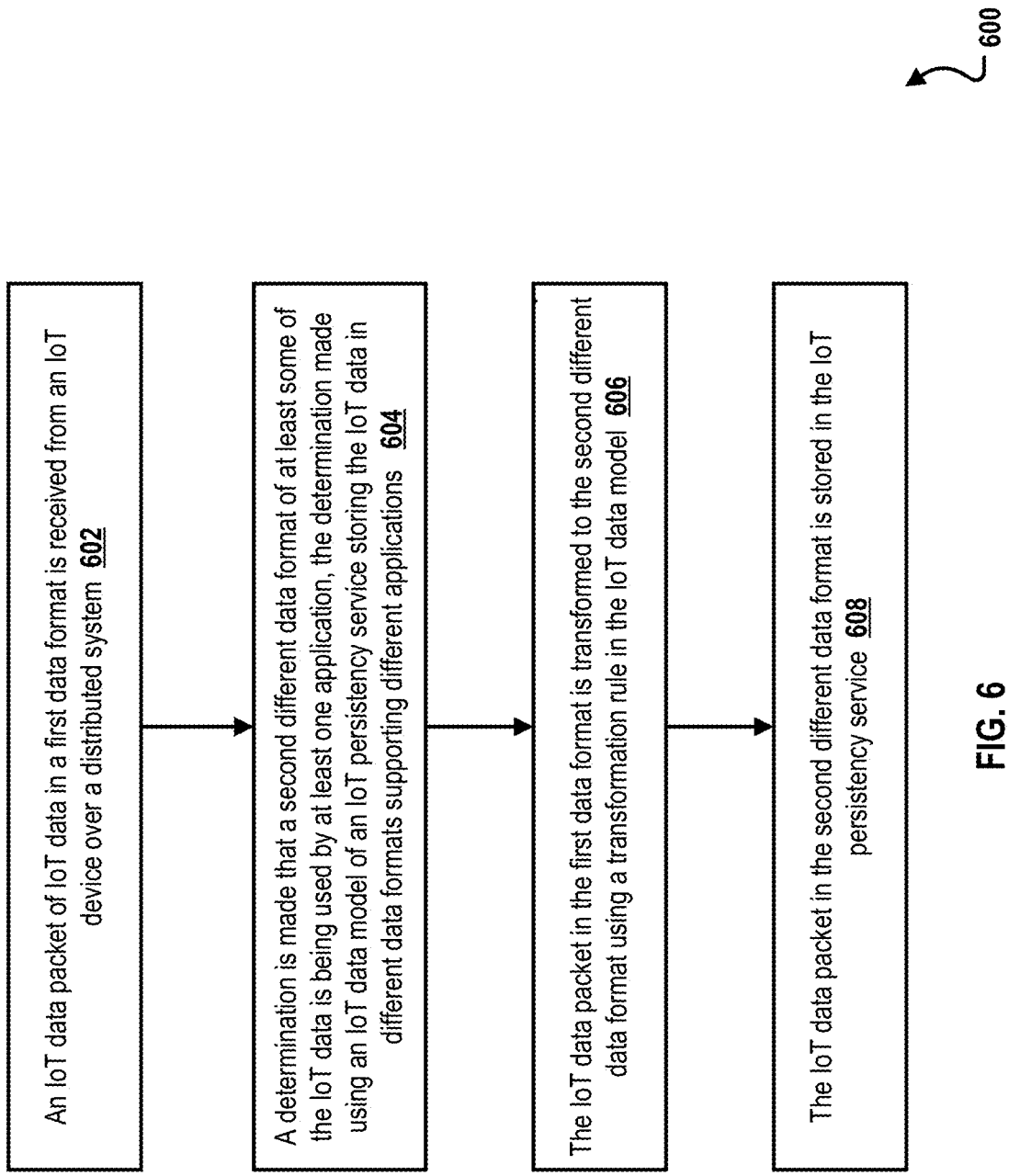
FIG. 6 is a flowchart illustrating an example of a computer-implemented method for receiving, transforming, and providing access to IoT data of different versions, according to an implementation of the present disclosure.

FIG. 6 is a flowchart illustrating an example of a computer-implemented method 600 for receiving, transforming, and providing access to IoT data of different versions, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, an IoT data packet of IoT data in a first data format is received from an IoT device over a distributed system. The IoT data packet can be, for example, data received by the data ingestion component 102 from a Type A IoT device 106 having a version 202 of V1.

In some implementations, the IoT data packet in the first data format can be stored in the IoT persistency service. For example, the V1 information can be stored in the persistency service 112 for applications that need access to the data in V1 format. The storage can be in addition to storing the data in other formats that are determined from the first data format. From 602, method 600 proceeds to 604.

At 604, a determination is made that a second different data format of at least some of the IoT data is being used by at least one application, the determination made using an IoT data model of an IoT persistency service storing the IoT data in different data formats supporting different applications. For example, the system 200 can use information similar in the persistency service 112 to determine that, for the received IoT data packet, a V2 version of the data needs to be determined and stored in the persistency service 112. From 604, method 600 proceeds to 606.

At 606, the IoT data packet in the first data format is transformed to the second different data format using a transformation rule in the IoT data model. For example, the data ingestion component 102 can use one of the DTMs 204 to process the received data, changing the data from one version (for example, V1) format to another (for example, V2).

In some implementations, transforming the IoT data packet in the first data format to the second different data format can include the use of information that is locally available, including from the IoT persistency service. For example, a determination can be made that the transformation is based entirely on (and can be accomplished using)

locally-stored data from the transformation rule. In this case, a data transformation module can be executed using the locally-stored data to convert the IoT data packet from the first data format (for example, V1) to the second different data format (for example, V2).

In some implementations, transforming the IoT data packet in the first data format to the second different data format can include the use of information obtained from a third-party source. For example, a determination can be made (using the transformation rule) that the transformation is based at least in part on (and can be accomplished from using) non-locally-stored data. A data acquisition module can be executed that does the following. A third-party data request can be created using the transformation rule and information in the IoT data packet. The third-party data request can be sent over the distributed system to a third-party service. The requested third-party data can be received from the third-party service. The IoT data in the second different data format can be created using at least the third-party data. From 606, method 600 proceeds to 608.

At 608, the IoT data packet in the second different data format is stored in the IoT persistency service. For example, the data can be stored in V2 format in the persistency service 112. After 608, method 600 stops.

In some implementations, method 600 can further include steps for handing a data request for data in a format that does not exist but can be created, for example, on-the-fly. For example, a request for IoT data in a third different format receiving from an application, such as an application that cannot use the data in formats V1 or V2. A determination can be made, using the IoT data model of the IoT persistency service, that the IoT data is not available in the third different format. Using the transformation rule, the IoT data can be transformed into the third different format. The IoT data in the third different format can optionally be stored in the IoT persistency service. The IoT data in the third different format can be provided to the application in response to the request.

In some implementations, transforming the IoT data into the third different format can include the following, for example, when the third different format can be created using locally-stored information. A determination can be made, using the transformation rule, that the transformation is based entirely on locally-stored data. In this case, a data transformation module can be executed, using the locally-stored data, to convert the IoT data packet from the first data format to the second different data format.

In some implementations, transforming the IoT data into the third different format can include the following, for example, when third-party information is needed to complete the request. A determination can be made, using the transformation rule, that the transformation is based at least in part on non-locally-stored data. A data acquisition module can be executed to complete the following. A third-party data request can be created using the transformation rule and information in the IoT data packet. The third-party data request to a third-party service can be sent over the distributed system. The third-party data can be received from the third-party service. The IoT data in the second different data format can be created using at least the third-party data.

Figure 7:
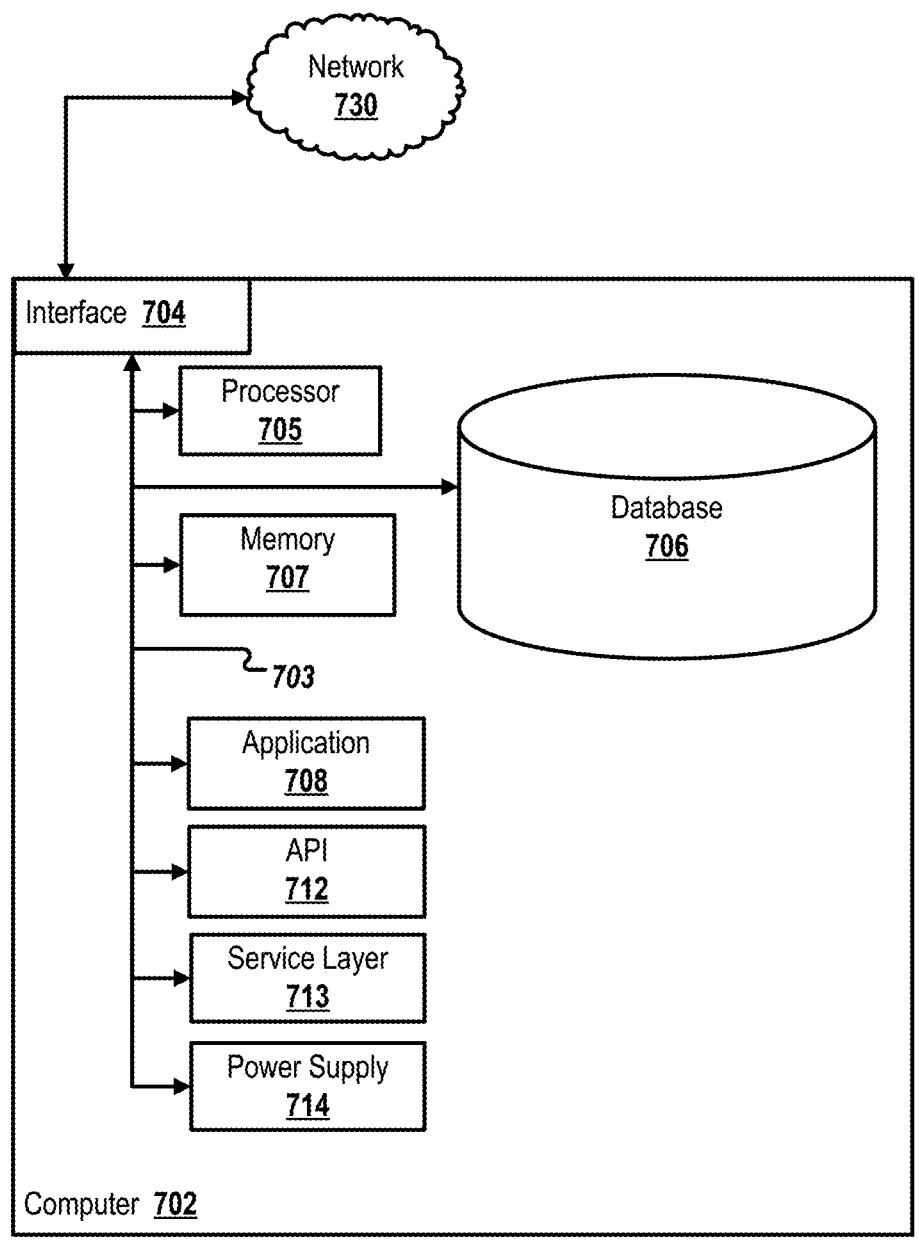
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 702 can include an input device, such as a keypad, keyboard, touch screen, another input device, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as a client, network component, a server, a database or another persistency, another role, or a combination of roles for performing the subject matter described in the present disclosure. The illustrated Computer 702 is communicably coupled with a Network 730. In some implementations, one or more components of the Computer 702 can be configured to operate within an environment, including cloud-computing-based, local, global, another environment, or a combination of environments.

At a high level, the Computer 702 is an electronic computing device operable to receive, transmit, process, store, or manage data and information associated with the described subject matter. According to some implementations, the Computer 702 can also include or be communicably coupled with a server, including an application server, email server, web server, caching server, streaming data server, another server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory, conventional, or another type of database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple Computers 702.

Described implementations of the subject matter can include one or more features, alone or in combination.

For example, in a first implementation, a computer-implemented method, comprising: receiving, from an Internet of Things (IoT) device over a distributed system, an IoT data packet of IoT data in a first data format; determining, using an IoT data model of an IoT persistency service storing the IoT data in different data formats supporting different applications, that a second different data format of at least some of the IoT data is being used by at least one application; transforming, using a transformation rule in the IoT data model, the IoT data packet in the first data format to the second different data format; and storing, in the IoT persistency service, the IoT data packet in the second different data format.

The foregoing and other described implementations can each, optionally, include one or more of the following features:

A first feature, combinable with any of the following features, further comprising storing, in the IoT persistency service, the IoT data packet in the first data format.

A second feature, combinable with any of the previous or following features, wherein transforming the IoT data packet in the first data format to the second different data format comprises: determining, from the transformation rule, that the transformation is based entirely on locally-stored data; and executing a data transformation module and using the locally-stored data to convert the IoT data packet from the first data format to the second different data format.

A third feature, combinable with any of the previous or following features, wherein transforming the IoT data packet in the first data format to the second different data format comprises: determining, from the transformation rule, that the transformation is based at least in part on non-locally-stored data; and executing a data acquisition module operable to: create, using the transformation rule and information in the IoT data packet, a third-party data request; send, over the distributed system, the third-party data request to a third-party service; receive, from the third-party service, third-party data; and create, using at least the third-party data, the IoT data in the second different data format.

A fourth feature, combinable with any of the previous or following features, further comprising: receiving, from an application, a request for IoT data in a third different format; determining, using the IoT data model of the IoT persistency service, that the IoT data is not available in the third different format; transforming, using the transformation rule, the IoT data into the third different format; optionally storing the IoT data in the third different format in the IoT persistency service; and providing, to the application in response to the request, the IoT data in the third different format.

A fifth feature, combinable with any of the previous or following features, wherein transforming the IoT data into the third different format comprises: determining, from the transformation rule, that the transformation is based entirely on locally-stored data; and executing a data transformation module and using the locally-stored data to convert the IoT data packet from the first data format to the second different data format.

A sixth feature, combinable with any of the previous or following features, wherein transforming the IoT data into the third different format comprises: determining, from the transformation rule, that the transformation is based at least in part on non-locally-stored data; and executing a data acquisition module operable to: create, using the transformation rule and information in the IoT data packet, a third-party data request; send, over the distributed system, the third-party data request to a third-party service; receive, from the third-party service, third-party data; and create, using at least the third-party data, the IoT data in the second different data format.

In a second implementation, a computer-implemented system, comprising: memory storing: persistency services storing different versions of IoT data; and a model defining transformations of data between versions; and a server interoperably coupled to the memory and performing operations comprising: computer-implemented method comprising: receiving, from an Internet of Things (IoT) device over a distributed system, an IoT data packet of IoT data in a first data format; determining, using an IoT data model of an IoT persistency service storing the IoT data in different data formats supporting different applications, that a second different data format of at least some of the IoT data is being used by at least one application; transforming, using a transformation rule in the IoT data model, the IoT data packet in the first data format to the second different data format; and storing, in the IoT persistency service, the IoT data packet in the second different data format.

The foregoing and other described implementations can each, optionally, include one or more of the following features:

A first feature, combinable with any of the following features, the operations further comprising storing, in the IoT persistency service, the IoT data packet in the first data format.

A second feature, combinable with any of the previous or following features, wherein transforming the IoT data packet in the first data format to the second different data format comprises: determining, from the transformation rule, that the transformation is based entirely on locally-stored data; and executing a data transformation module and using the locally-stored data to convert the IoT data packet from the first data format to the second different data format.

A third feature, combinable with any of the previous or following features, wherein transforming the IoT data packet in the first data format to the second different data format comprises: determining, from the transformation rule, that the transformation is based at least in part on non-locally-stored data; and executing a data acquisition module operable to: create, using the transformation rule and information in the IoT data packet, a third-party data request; send, over the distributed system, the third-party data request to a third-party service; receive, from the third-party service, third-party data; and create, using at least the third-party data, the IoT data in the second different data format.

A fourth feature, combinable with any of the previous or following features, the operations further comprising: receiving, from an application, a request for IoT data in a third different format; determining, using the IoT data model of the IoT persistency service, that the IoT data is not available in the third different format; transforming, using the transformation rule, the IoT data into the third different format; optionally storing the IoT data in the third different format in the IoT persistency service; and providing, to the application in response to the request, the IoT data in the third different format.

A fifth feature, combinable with any of the previous or following features, wherein transforming the IoT data into the third different format comprises: determining, from the transformation rule, that the transformation is based entirely on locally-stored data; and executing a data transformation module and using the locally-stored data to convert the IoT data packet from the first data format to the second different data format.

A sixth feature, combinable with any of the previous or following features, wherein transforming the IoT data into the third different format comprises: determining, from the transformation rule, that the transformation is based at least in part on non-locally-stored data; and executing a data acquisition module operable to: create, using the transformation rule and information in the IoT data packet, a third-party data request; send, over the distributed system, the third-party data request to a third-party service; receive, from the third-party service, third-party data; and create, using at least the third-party data, the IoT data in the second different data format.

In a third implementation, non-transitory computer-readable medium storing one or more instructions executable by a computer system to perform operations, comprising: receiving, from an Internet of Things (IoT) device over a distributed system, an IoT data packet of IoT data in a first data format; determining, using an IoT data model of an IoT persistency service storing the IoT data in different data formats supporting different applications, that a second different data format of at least some of the IoT data is being used by at least one application; transforming, using a transformation rule in the IoT data model, the IoT data packet in the first data format to the second different data format; and storing, in the IoT persistency service, the IoT data packet in the second different data format.

The foregoing and other described implementations can each, optionally, include one or more of the following features:

A first feature, combinable with any of the following features, the operations further comprising storing, in the IoT persistency service, the IoT data packet in the first data format.

A second feature, combinable with any of the previous or following features, wherein transforming the IoT data packet in the first data format to the second different data format comprises: determining, from the transformation rule, that the transformation is based entirely on locally-stored data; and executing a data transformation module and using the locally-stored data to convert the IoT data packet from the first data format to the second different data format.

A third feature, combinable with any of the previous or following features, wherein transforming the IoT data packet in the first data format to the second different data format comprises: determining, from the transformation rule, that the transformation is based at least in part on non-locally-stored data; and executing a data acquisition module operable to: create, using the transformation rule and information in the IoT data packet, a third-party data request; send, over the distributed system, the third-party data request to a third-party service; receive, from the third-party service, third-party data; and create, using at least the third-party data, the IoT data in the second different data format.

A fourth feature, combinable with any of the previous or following features, the operations further comprising: receiving, from an application, a request for IoT data in a third different format; determining, using the IoT data model of the IoT persistency service, that the IoT data is not available in the third different format; transforming, using the transformation rule, the IoT data into the third different format; optionally storing the IoT data in the third different format in the IoT persistency service; and providing, to the application in response to the request, the IoT data in the third different format.

A fifth feature, combinable with any of the previous or following features, wherein transforming the IoT data into the third different format comprises: determining, from the transformation rule, that the transformation is based entirely on locally-stored data; and executing a data transformation module and using the locally-stored data to convert the IoT data packet from the first data format to the second different data format.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, from an Internet of Things (IoT) device over a distributed system, an IoT data packet of IoT data in a first data format;
   determining, using an IoT data model of an IoT persistency service storing the IoT data in different data formats supporting different applications, that a second different data format of at least some of the IoT data is being used by at least one application;
   transforming, using a transformation rule in the IoT data model, the IoT data packet in the first data format to the second different data format, wherein the transformation rule defines a transformation between different versions of IoT data, and wherein the transformation rule identifies whether one or both of local and non-local data are used in the transformation; and
   storing, in the IoT persistency service, the IoT data packet in the second different data format.

2. The computer-implemented method of claim 1, further comprising storing, in the IoT persistency service, the IoT data packet in the first data format.

3. The computer-implemented method of claim 1, wherein transforming the IoT data packet in the first data format to the second different data format comprises:
   determining, from the transformation rule, that the transformation is based entirely on locally-stored data; and
   executing a data transformation module and using the locally-stored data to convert the IoT data packet from the first data format to the second different data format.

4. The computer-implemented method of claim 1, wherein transforming the IoT data packet in the first data format to the second different data format comprises:
   determining, from the transformation rule, that the transformation is based at least in part on non-locally-stored data; and
   executing a data acquisition module operable to:
      create, using the transformation rule and information in the IoT data packet, a third-party data request;
      send, over the distributed system, the third-party data request to a third-party service;
      receive, from the third-party service, third-party data; and
      create, using at least the third-party data, the IoT data in the second different data format.

5. The computer-implemented method of claim 1, further comprising:
   receiving, from an application, a request for IoT data in a third different format;
   determining, using the IoT data model of the IoT persistency service, that the IoT data is not available in the third different format;
   transforming, using the transformation rule, the IoT data into the third different format;
   optionally storing the IoT data in the third different format in the IoT persistency service; and
   providing, to the application in response to the request, the IoT data in the third different format.

6. The computer-implemented method of claim 5, wherein transforming the IoT data into the third different format comprises:
   determining, from the transformation rule, that the transformation is based entirely on locally-stored data; and
   executing a data transformation module and using the locally-stored data to convert the IoT data packet from the first data format to the second different data format.

7. The computer-implemented method of claim 5, wherein transforming the IoT data into the third different format comprises:
   determining, from the transformation rule, that the transformation is based at least in part on non-locally-stored data; and
   executing a data acquisition module operable to:
      create, using the transformation rule and information in the IoT data packet, a third-party data request;
      send, over the distributed system, the third-party data request to a third-party service;
      receive, from the third-party service, third-party data; and create, using at least the third-party data, the IoT data in the second different data format.

8. A computer-implemented system, comprising:
memory storing:
persistency services storing different versions of IoT data; and
a model defining transformations of data between versions; and
a server interoperably coupled to the memory and performing operations comprising:
receiving, from an Internet of Things (IoT) device over a distributed system, an IoT data packet of IoT data in a first data format;
determining, using an IoT data model of an IoT persistency service storing the IoT data in different data formats supporting different applications, that a second different data format of at least some of the IoT data is being used by at least one application;
transforming, using a transformation rule in the IoT data model, the IoT data packet in the first data format to the second different data format, wherein the transformation rule defines a transformation between different versions of IoT data, and wherein the transformation rule identifies whether one or both of local and non-local data are used in the transformation; and
storing, in the IoT persistency service, the IoT data packet in the second different data format.

9. The computer-implemented system of claim 8, the operations further comprising storing, in the IoT persistency service, the IoT data packet in the first data format.

10. The computer-implemented system of claim 8, wherein transforming the IoT data packet in the first data format to the second different data format comprises:
determining, from the transformation rule, that the transformation is based entirely on locally-stored data; and
executing a data transformation module and using the locally-stored data to convert the IoT data packet from the first data format to the second different data format.

11. The computer-implemented system of claim 8, wherein transforming the IoT data packet in the first data format to the second different data format comprises:
determining, from the transformation rule, that the transformation is based at least in part on non-locally-stored data; and
executing a data acquisition module operable to:
create, using the transformation rule and information in the IoT data packet, a third-party data request;
send, over the distributed system, the third-party data request to a third-party service;
receive, from the third-party service, third-party data; and
create, using at least the third-party data, the IoT data in the second different data format.

12. The computer-implemented system of claim 8, the operations further comprising:
receiving, from an application, a request for IoT data in a third different format;
determining, using the IoT data model of the IoT persistency service, that the IoT data is not available in the third different format;
transforming, using the transformation rule, the IoT data into the third different format;
optionally storing the IoT data in the third different format in the IoT persistency service; and
providing, to the application in response to the request, the IoT data in the third different format.

13. The computer-implemented system of claim 12, wherein transforming the IoT data into the third different format comprises:
determining, from the transformation rule, that the transformation is based entirely on locally-stored data; and
executing a data transformation module and using the locally-stored data to convert the IoT data packet from the first data format to the second different data format.

14. The computer-implemented system of claim 12, wherein transforming the IoT data into the third different format comprises:
determining, from the transformation rule, that the transformation is based at least in part on non-locally-stored data; and
executing a data acquisition module operable to:
create, using the transformation rule and information in the IoT data packet, a third-party data request;
send, over the distributed system, the third-party data request to a third-party service;
receive, from the third-party service, third-party data; and
create, using at least the third-party data, the IoT data in the second different data format.

15. A non-transitory computer-readable medium storing one or more instructions executable by a computer system to perform operations, comprising:
receiving, from an Internet of Things (IoT) device over a distributed system, an IoT data packet of IoT data in a first data format;
determining, using an IoT data model of an IoT persistency service storing the IoT data in different data formats supporting different applications, that a second different data format of at least some of the IoT data is being used by at least one application;
transforming, using a transformation rule in the IoT data model, the IoT data packet in the first data format to the second different data format, wherein the transformation rule defines a transformation between different versions of IoT data, and wherein the transformation rule identifies whether one or both of local and non-local data are used in the transformation; and
storing, in the IoT persistency service, the IoT data packet in the second different data format.

16. The non-transitory computer-readable medium of claim 15, the operations further comprising storing, in the IoT persistency service, the IoT data packet in the first data format.

17. The non-transitory computer-readable medium of claim 15, wherein transforming the IoT data packet in the first data format to the second different data format comprises:
determining, from the transformation rule, that the transformation is based entirely on locally-stored data; and
executing a data transformation module and using the locally-stored data to convert the IoT data packet from the first data format to the second different data format.

18. The non-transitory computer-readable medium of claim 15, wherein transforming the IoT data packet in the first data format to the second different data format comprises:
determining, from the transformation rule, that the transformation is based at least in part on non-locally-stored data; and
executing a data acquisition module operable to:
create, using the transformation rule and information in the IoT data packet, a third-party data request;

send, over the distributed system, the third-party data request to a third-party service;

receive, from the third-party service, third-party data; and create, using at least the third-party data, the IoT data in the second different data format.

19. The non-transitory computer-readable medium of claim 15, the operations further comprising:

receiving, from an application, a request for IoT data in a third different format;

determining, using the IoT data model of the IoT persistency service, that the IoT data is not available in the third different format;

transforming, using the transformation rule, the IoT data into the third different format;

optionally storing the IoT data in the third different format in the IoT persistency service; and providing, to the application in response to the request, the IoT data in the third different format.

20. The non-transitory computer-readable medium of claim 19, wherein transforming the IoT data into the third different format comprises:

determining, from the transformation rule, that the transformation is based entirely on locally-stored data; and executing a data transformation module and using the locally-stored data to convert the IoT data packet from the first data format to the second different data format.

\* \* \* \* \*